May 16, 1939. J. C. ROSE Re. 21,089

FOCUSING MEANS FOR INCANDESCENT STUDIO SPOTLIGHTS

Original Filed May 21, 1935 3 Sheets-Sheet 1

Inventor
Jess C. Rose.

Attorney.

May 16, 1939. J. C. ROSE Re. 21,089

FOCUSING MEANS FOR INCANDESCENT STUDIO SPOTLIGHTS

Original Filed May 21, 1935 3 Sheets-Sheet 2

Inventor
Jess C. Rose.

Attorney.

FOCUSING MEANS FOR INCANDESCENT STUDIO SPOTLIGHTS

Original Filed May 21, 1935 3 Sheets-Sheet 3

Inventor
Jess C. Rose.

Attorney.

Reissued May 16, 1939

Re. 21,089

UNITED STATES PATENT OFFICE 21,089

FOCUSING MEANS FOR INCANDESCENT STUDIO SPOTLIGHTS

Jess C. Rose, Los Angeles, Calif., assignor to Motion Picture Electric Products, Los Angeles, Calif., a corporation of California Original No. 2,083,506, dated June 8, 1937, Serial No. 22,546, May 21, 1935. Application for reissue March 23, 1939, Serial No. 263,681

15 Claims. (Cl. 240—44.2)

This invention relates generally to incandescent spot lamps such as are used in motion picture studios for illumination of sets, and more particularly to focusing means for the incandescent light globe of such lamps.

Studio spot lamps of the character mentioned are ordinarily provided with a light globe that is movable forwardly and rearwardly along the axis of the reflector, for the purpose of adjusting the lamp to cast a relatively small "spot" of light, or else to spread the light out and "flood" the object. The spot is of course formed when the globe is at or near the focal point of the reflector, and flood characteristics are obtained when the globe is moved nearer the reflector. It has been the practice to provide an operating means for adjusting the position of the globe between spot and flood positions involving a lead screw having screwthreaded connection with globe carrier member. Such lead screw is ordinarily rotated by a crank or similar means, and a large number of crank rotations are required to move the globe between spot and flood positions. Obviously adjustment of such a lamp involves considerable effort and consumption of time. The time factor involved in adjusting such lamps is of particular importance in the lighting of a motion picture set, since time is at a high premium, and when the taking of a scene is waiting, a motion picture director is highly impatient with the slightest delay in making final lamp adjustments.

It is accordingly one object of the present invention to provide a quickly operating and generally improved means for adjusting the globe of an incandescent studio spotlight between spot and flood positions.

In accordance with a preferred form of the present invention, the light globe carriage is arranged to slide on a pair of guide rods which are parallel to the axis of the reflector, and the carriage is moved through a link connected at one end to the carriage and at the other end to an arm mounted on a manually rotatable shaft journalled in a wall of the lamp. The arrangement is made such that the full range of movement of the lamp globe carriage (between spot and flood positions) is accomplished by one revolution or less of the manual operating shaft, that is, within one revolution of said shaft, full adjustment being had in present preferred forms of the invention by a 180 degree turn of said shaft. A suitable knob or handle is mounted on the manually operable end of the shaft, and the shaft carries a suitable pointer, with which is associated a scale showing spot, flood, and intermediate positions.

Since in such an arrangement as thus generally described, the light globe carriage moves rather freely on its guide rods, the manual adjustment means as described offering no particular resistance, the light globe carriage has a tendency to slide along the guide rods as the spot lamp is tilted up or down on its horizontal trunnion mounting axis. It is a feature of the present invention that such accidental movement or displacement of the light globe carriage in the course of ordinary operation is prevented. This is accomplished in a preferred embodiment, by the provision of friction means which yieldingly resists adjustment movement of the light globe carriage on the guide rods. This friction means offers the necessary resistance to prevent accidental displacement of the carriage, but does not bind the operating means sufficiently to interfere with desirable ease of operation.

It is customary to transport lamps of the character mentioned piled one on top of another, with the front faces of the lamps turned downwardly. The front lenses of the lamps are for this purpose removed, and the crowned back of each lamp projects somewhat within the front opening of the lamp next above it. The lamp being in such a position, the light globe carriage tends to work downwardly on its guide rods as the lamps are transported, even despite the frictional means provided to prevent movement in ordinary operation. As the light globe carriage thus works downwardly, either the "spill-ring" carried by the carriage immediately in front of the globe, or the globe itself, is apt finally to engage the crowned back of the lamp next below. If a spill-ring is on the carriage, it is thereupon caused to be bent back, with the frequent result of coming against and breaking the globe, while if no spill-ring is in place, the globe may become broken by direct engagement with the crowned back of the lamp below.

It is accordingly a further object of the invention to provide a lamp that has a comparatively freely moving light globe carriage, with a locking arrangement preventing the light globe carriage from accidentally moving forwardly from a fixed retracted position when the lamp is in a face-down position.

The invention will now be best understood by referring to the following detailed description of typical and preferred embodiments thereof, reference for this purpose being had to the accompanying drawings, in which:

Fig. 3b is a detail section taken as indicated by line 3b—3b of Fig. 3a;

Figure 1:
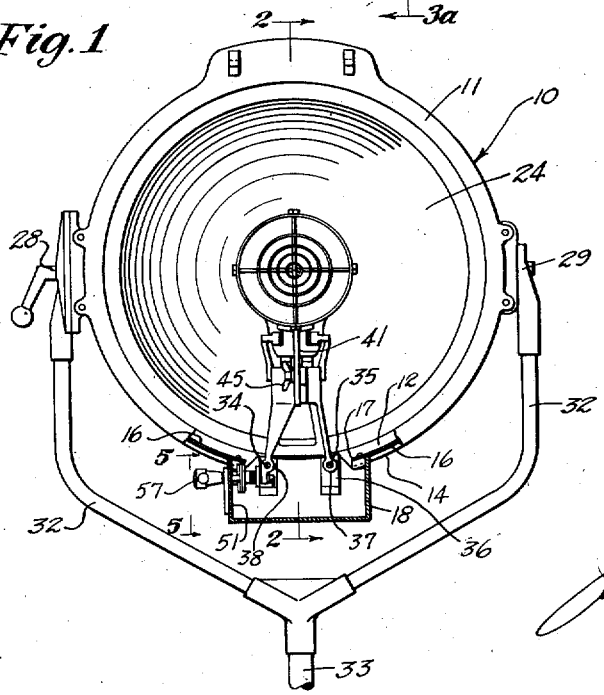
Fig. 1 is a front elevation of a lamp embodying my invention, the front lens being removed and parts being shown in section.
Figure 2A:
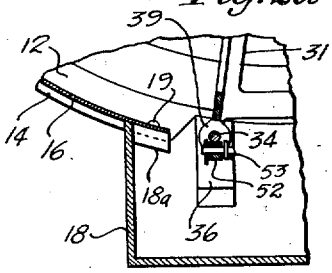
Fig. 2a is a detail section taken on line 2a—2a of Fig. 2.
Figure 2:
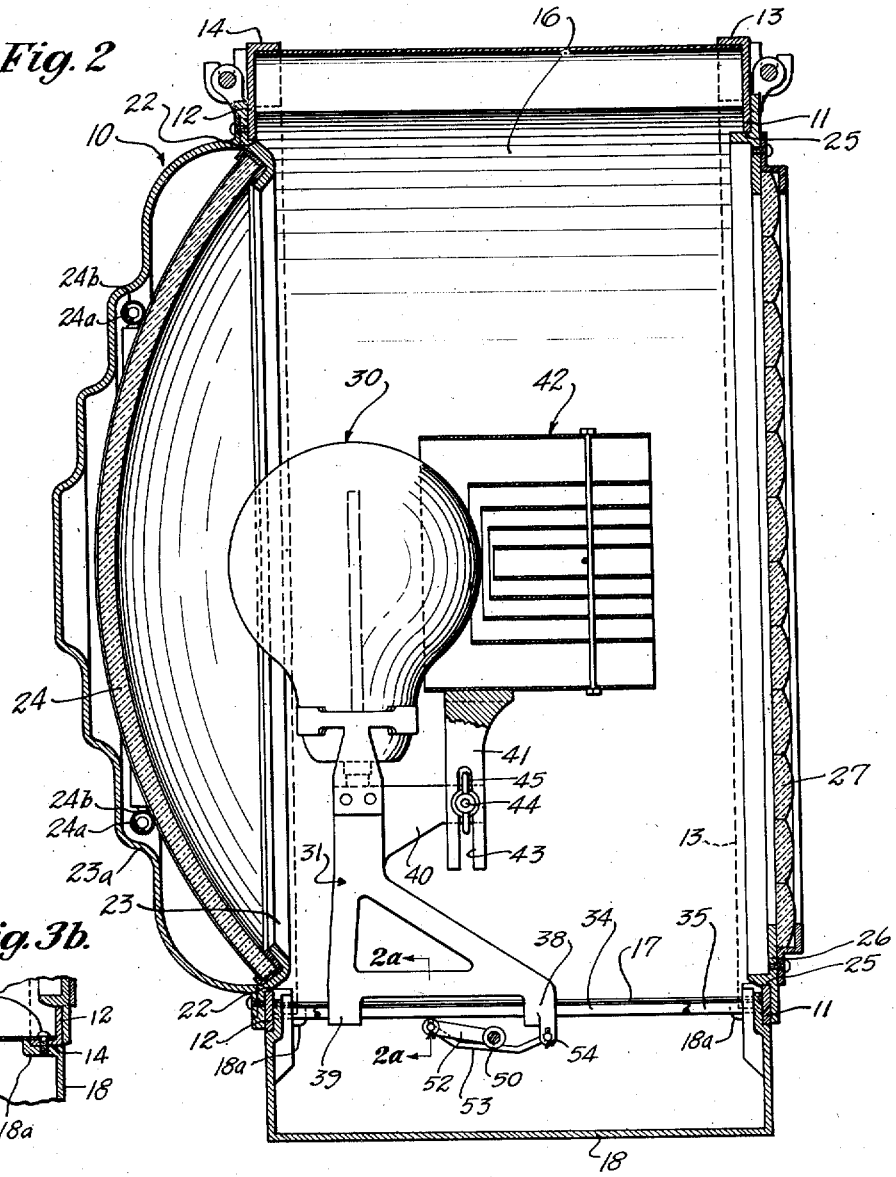
Fig. 2 is a vertical section taken on line 2—2 of Fig. 1, with certain parts shown in elevation.

The lamp, designated generally by numeral 10, is made up of front and rear ring frame members 11 and 12, respectively, formed with inwardly extending flanges 13 and 14 (see Figs. 1 and 2). Mounted within flanges 13 and 14 are two substantially semi-cylindric shell or side wall members 16. The lower edges of these side wall members define an opening which communicates with the interior of a rectangular case or box 18 (Figs. 1 and 3a). Ring flange members 13 and 14 terminate at edges 17, as indicated in Fig. 3a. Box 18, is provided with brackets 18a which engage the undersides of the lower ends of flanges 13 and 14, and screws 19 passing downwardly through side walls 16 and flanges 13 and 14 threaded into brackets 18a hold the parts in assembly, all as illustrated in Figs. 3a and 3b. This casing member 18 is designed to house certain operating mechanisms for the carriage, etc., and may for the purpose of certain of the claims be considered as a part of the lamp frame.

Rearward ring frame 12 has an opening 22 adapted to receive a rear annular closure member 23 carrying a usual curved reflector mirror 24. The back of the reflector is yieldingly supported by an arrangement of four coil springs 24a covered with a suitable padding material, as asbestos, as indicated at 24b, the junctures of the several springs being connected by means of supporting wires 24c to annular member 23. The lamp has a crowned back member 23a, which is secured to member 23, as shown.

Front frame ring 11 has an annular opening 25 which receives a carriage ring 26 in which is mounted front glass or lens member 27. The lamp is trunnioned on a horizontal axis at 28 and 29 on the upper ends of supporting arms 32 mounted on a usual standard 33.

The incandescent lamp globe is designated at 30, and is shown mounted on a lamp globe carriage 31 which is adapted to slide forwardly and rearwardly, in a direction parallel to the axis of mirror 24, on a pair of parallel guide rods 34 and 35 which are mounted at their ends in brackets 36 formed on the inner surfaces of the ends of box 18. As clearly shown, these rods are parallel to the axis of mirror 24 and are in a horizontal plane. Carriage 31 is provided with a bearing 37 which slides freely on guide rod 35, and with forward and rearward bearings 38 and 39 which slide freely on guide rod 34.

Carriage 31 is shown provided with a forwardly extending bracket 40 on which is mounted the supporting arm 41 of a conventional "spill-ring" 42, which is positioned immediately in front of light globe 30. As a means for detachably mounting arm 41 on bracket 40, arm 41 is provided with an open-ended slot 43 which is adapted to receive a clamp screw 44 mounted in bracket 40, a wing nut 45 being provided on screw 44 to bear against the side of arm 41 and thus clamp it tightly to bracket 40. It will be evident that this construction permits the spill-ring to be easily and quickly mounted and dismounted.

Figure 4:
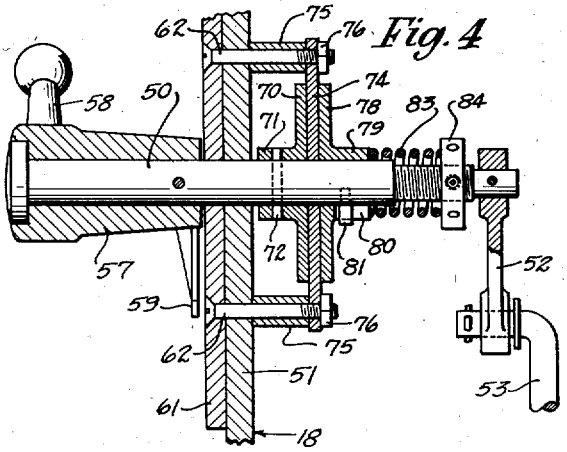
Fig. 4 is a detail section taken as indicated by line 4—4 of Fig. 3.

The preferred means in accordance with the present invention for sliding lamp carriage 31 back and forth on rods 34 and 35, for the purpose of adjusting the lamp globe between flood and spot positions, will now be described. A horizontal operating shaft 50 is rotatably mounted in side wall 51 of box 18 (Figs. 2 and 4). This shaft is so located as to be to the rear of forward lamp-carriage bearing 38 when the lamp-carriage is in its rearward or flood position, as it is in Fig. 2, and is located just below guide rods 34 and 35, as shown. Pinned on the inner end of shaft 50 is an arm 52, the swinging end of which is pivotally connected to one end of a link 53, the other end of link 53 being pivotally connected at 54 with lamp-carriage bearing 38.

The outer end of shaft 50 is provided with an operating knob 57 provided with a handle 58 and a pointer 59, the latter moving over 180° scale 60 formed on a scale plate 61 which is affixed, as by screws 62, to the outer surface of wall 51.

Figure 3:
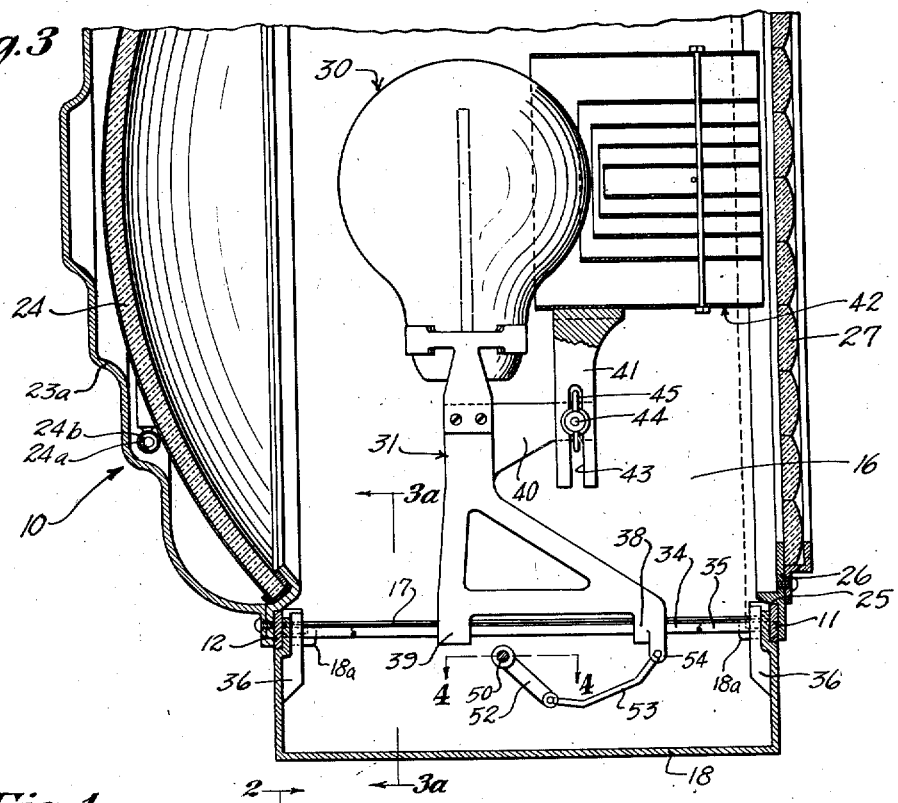
Fig. 3 is a view similar to a portion of Fig. 1, but showing the lamp carriage in a different position.
Figure 3B:
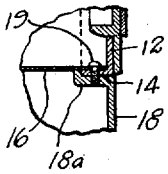
Figure 3A:
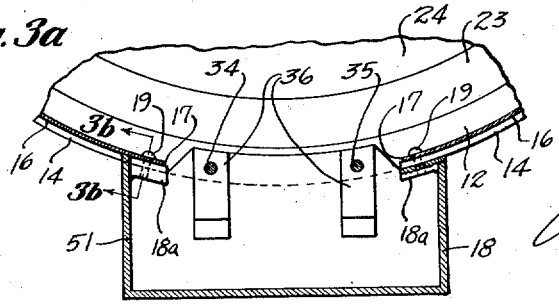
Fig. 3a is a section as indicated by line 3a—3a of Fig. 3.
Figure 5:
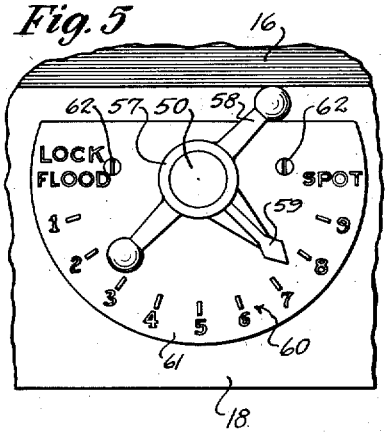
Fig. 5 is a detail taken as indicated by arrows 5—5 in Fig. 1.

It will be evident from a consideration of Figs. 2 and 3 that the full range of forward and rearward movement of the lamp carriage is accomplished by a 180 degree rotation of shaft 50 and arm 52. The lamp carriage is in its rearmost (flood-light) position when arm 52 is in a horizontal rearwardly extended position, and is in its extreme forward position (spot) when arm 52 is in a horizontal forwardly extending position, globe 30 being substantially at the focal point of mirror 24 in the latter position. The range of movement of the lamp carriage is of course determined by the length of arm 52, and link 53 is of such length as will place the carriage and lamp in correct "full-flood" and "spot" positions in the two described positions of arm 52. Pointer 59 is so mounted on shaft as to point straight rearwardly when the lamp carriage is in its rearmost or flood position, and to point straight forwardly when the carriage is in its extreme forward or spot position. These two positions are designated on scale 60 as "flood" and "spot", respectively. The 180° range of movement of pointer 59 is then divided into ten scale divisions designated by numerals 1, 2, 3, etc. In Fig. 3 the carriage is illustrated in a position close to "spot", and in Fig. 5 the pointer is shown in a corresponding position.

In the position of Fig. 2, arm 52 is just above horizontal position and is in engagement with guide rod 34, which overlies arm 52 and provides a stop therefor (see Fig. 2a). When arm 52 is thus in engagement with guide rod 34, pointer 52 is above "flood" position, and its position is designated on scale 60 by the word "lock". It will be evident that in this position of the device, the lamp carriage is moved slightly forward from its extreme rearward position, but that further forward movement is prevented by the engagement of arm 52 with the underside of guide rod 34. The advantage of this "lock" position will be explained hereinafter.

A friction means is provided to establish a desirable resistance to movement of the lamp carriage on the guide rods, so that the carriage will move easily when handle 58 is turned, but will not slide back and forth as the lamp is tilted up or down. As shown in Fig. 4, operating shaft 50 is provided just inside of wall 51 with a friction disk 70, said disk in the present instance being provided with a hub 71 fastened to shaft 50 by means of pin 72. Disk 70 comes against one side of a stationary friction disk 74 carried by the outer ends of the aforementioned screws 62, disk 74 being positioned between sleeves 75 bearing against wall 51, and nuts 76 being screwthreaded on the rear ends of the screws. Mounted on shaft 50 so as to bear against the surface of disk 74 which is opposite disk 70, is a friction disk 78, said disk 78 being provided with a hub 79 which is arranged to slide longitudinally on shaft 50 but is held against rotation thereon. For instance, hub 79 may be formed with a slot 80 formed in a direction parallel to shaft 50, which slot receives a pin 81 set into said shaft. Friction disk 78 is thus splined on shaft 50. Encircling shaft 50 and bearing against the end of hub 79 is a compression spring 83, the other end of which seats against a collar 84 tightly mounted on shaft 50, all as clearly shown in Fig. 4. It will be evident that spring 83 presses friction disk 78 into tight engagement with one surface of stationary friction disk 74, and also acts through collar 84 and shaft 50 to press disk 70 into tight engagement with the other surface of disk 74, thus setting up a yieldable or frictional resistance to rotation of shaft 50. The adjustment of spring 83 is of course such, however, that shaft 50 may be turned without difficulty, only sufficient frictional resistance being set up to prevent carriage 31 from sliding back and forth on the guide rods merely due to tilting of the lamp.

It will now be evident that I have provided a novel lamp carriage adjustment mechanism which is quick in action, simple in construction, and convenient in use. The operating handle, in the preferred form of the lamp, is rotated through but one half of a turn to translate the lamp carriage over its entire range of movement. The mechanism moves easily, but is prevented from accidental displacement from a given position as the lamp is tilted, by the yielding friction means acting on the manual operating shaft.

When lamps of the type disclosed are to be transported, they are commonly stacked one on top of another, with their crowned backs up, and the front lens carrying rings removed, so that the crowned back of each lamp may be received within the open side of the lamp above it. When the lamps are so stacked, the operating handle is turned to "lock" position, which places the lamp carriage in the position of Fig. 2. In such position, as mentioned previously, arm 52 is past center and in engagement with guide rod 34, and the lamp carriage is stopped against sliding downwardly on rods 34 and 35, with the liability of finally breaking the light globe.

Attention is called to the fact that the lamp carriage, guide rods, and focusing mechanism are supported exclusively on lower housing 18, and that this entire assembly may be removed simply by removing screws 19 that secure housing 18 to frame ring flanges 13 and 14.

Figure 6:
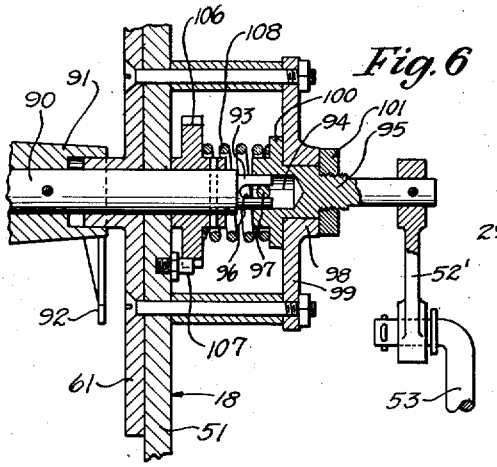
Fig. 6 is a view similar to Fig. 4 but showing a modification.
Figure 8:
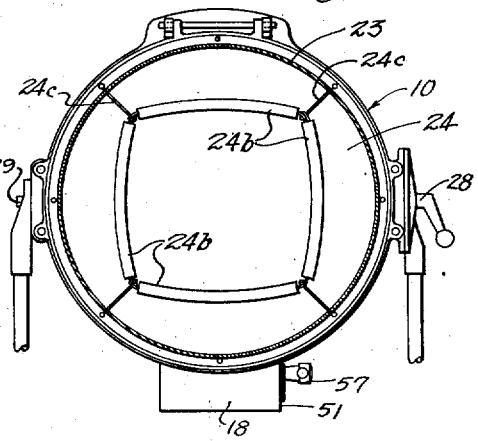
Fig. 8 is a view of the back of the lamp, with the crowned back closure member broken away.

Fig. 6 shows a modification of the lamp carriage operating means. The operating link which is connected to the lamp carriage is again indicated at 53, and the casing wall and scale plate are again indicated by numerals 51 and 61, respectively. It will be understood that the lamp carriage and link 53 may be exactly the same as in the form previously described, as may the mechanism casing of which wall 51 is a part. A manual operating shaft 90 is journalled in wall 51 on an axis which is located the same as is the axis of shaft 50 in the form of Fig. 4. The exterior end of shaft 90 carries a handle 91 and a pointer 92, and its inner end is reduced, as at 93, and is slidably received within a socket 94 formed in the end of a shaft member 95. Reduced shaft end 93 has a notch 96 adapted to receive and drivingly engage a cross-pin 97 set in socket 94. Shaft member 95, which is journalled in a bearing 98 carried by a stationary frame plate 99, is confined against longitudinal movement by means of a flange 100 near its inner end which engages the adjacent surface of bearing 98, and a collar 101 screwthreaded onto the shaft and positioned adjacent the opposite face of said bearing.

On the extreme inner end of shaft 95 is pinned an arm 52', exactly similar to the arm 52 of the previously described form shown in Fig. 4, the outer end of arm 52' being pivotally connected to the end of link 53, as in the previous instance. It will be evident that rotation of knob 91 and shaft 90 will cause shaft 95 to be rotated to swing arm 52' for the purpose of moving link 53 and so shifting the lamp carriage, substantially as in the previous form.

A locking device is provided to prevent accidental shifting of the focusing mechanism as the lamp is tilted. Pinned on shaft 90 adjacent the inner surface of wall 51 is a spur gear 106, and normally meshing therewith is a stop element 107, which is set into wall 51, as clearly shown in Fig. 6. It will be evident that with the parts in the position of Fig. 6, the stop element in engagement with the teeth of gear 106 prevents shaft 90 from being rotated. But by grasping knob 91 and forcing shaft 90 inwardly until gear 106 is free of element 107, the mechanism may be freely operated. Shaft 90 is normally yieldingly held in the locked position of Fig. 6 by means of a coil compression spring 108 which is confined between flange 100 and the opposed face of spur gear 106. Thus, to change the focus of the lamp, knob 91 is grasped and forced inwardly against spring 108 to free gear 106 from element 107, and may then be rotated to accomplish the desired shift of the lamp carriage. When knob 91 is then released, spring 108 acts to move shaft 90 back to the position of Fig. 6, gear 106 moving back into locking engagement with locking element 107. The lamp carriage is therefore automatically locked against movement longitudinally on the guide rods at all times that knob 91 is not being manually pressed inwardly to operating position, and the lamp carriage is therefore prevented during normal use of the lamp from sliding back and forth on its guide rods as the lamp is tilted.

Figure 7:
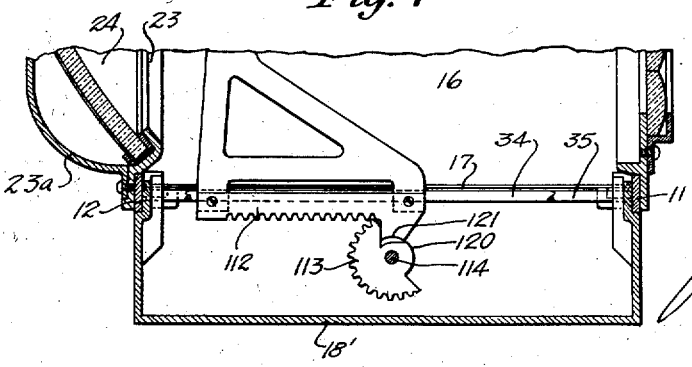
Fig. 7 is a view similar to a portion of Fig. 3 but showing a modification of the lamp carriage operating means.

Fig. 7 shows another variational form of the lamp carriage operating means. In this instance the lamp carriage is shown provided on its underside with a rack 112, and adapted to mesh with this rack is a gear segment 113 fast on an operating shaft 114 which will be understood as journalled for rotation in the side wall of the enclosing case. Rotation of shaft 114, which will be understood as accomplished by a manual knob of the same type as illustrated in Fig. 4, causes rotation of gear 113 to translate rack 112 and the lamp carriage between its proper limits of operation. The diameter of gear 113 is preferably such as will cause translation of the lamp carriage between such limits by a half-rotation of shaft 114.

Shaft 114 is preferably provided with a friction retarding means the same as is illustrated in Fig. 4, it being understood that Fig. 4 is illustrative of the friction means and operating knob used with shaft 114 of Fig. 7. It will be noted, however, that shaft 114 must be rotated in a direction opposite to that of shaft 50 of Fig. 4 in order to accomplish a given adjustment of the lamp carriage.

Fig. 7 also shows locking means adapted to hold the lamp carriage securely in a retracted position during transportation of the lamp. For this purpose, gear member 113 is provided with a rounded portion 120 adapted to come into engagement with an arcuate surface 121 at the outer end of rack member 112 after gear 113 has been moved out of mesh with the rack at the inner limit of lamp carriage movement. It will be obvious that when surface 120 is in engagement with surface 121, the lamp carriage is securely locked against translation on the guide rods.

It will be understood the drawings and description are to be considered merely as illustrative of and not restrictive on the broader claims appended hereto, for various changes in design, structure and arrangement may be made without departing from the spirit and scope of said claims.

I claim:

1. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a manually rotatable shaft extending through a wall of said casing on an axis at right angles to the direction of carriage movement, an operative interconnection between the portion of said shaft that is inside the casing and said carriage so arranged that the light source is moved between spot and full flood positions within one revolution of the manually rotatable shaft, and manual shaft rotating means operating on the exterior portion of the shaft.

2. A studio spot lamp embodying a substantially cylindric lamp casing, an optical light projecting and focusing element therein, a depending mechanism enclosing casing joined to said cylindric lamp casing at the bottom thereof, said two casings opening into one another, a light source carriage within said cylindric lamp casing adapted to carry a light source on the axis of said optical element, means supporting and guiding said carriage for forward and rearward movement in a direction parallel to the optical axis of said optical element, whereby said light source is movable between spot and flood positions, a horizontal manually rotatable shaft extending through a side wall of said depending mechanism enclosing casing and disposed at right angles to the direction of carriage movement, an operative interconnection between the portion of said shaft that is inside the casing and said carriage so arranged that the light source is moved between spot and full flood positions within one revolution of the manually rotatable shaft, and manual shaft rotating means operating on the exterior portion of the shaft.

3. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a manually rotatable shaft extending through a wall of said casing on an axis at right angles to the direction of carriage movement, an operative interconnection between the inner portion of said shaft and the carriage so arranged that the light source is moved between spot and full flood positions within one revolution of the manually rotatable shaft, and friction means yieldingly resisting operation of the manual shaft.

4. A studio spot lamp embodying a substantially cylindric side wall casing, an optical light projecting and focusing element therein, a depending mechanism enclosing casing joined to said side wall casing at the bottom thereof, said two casings opening into one another, a light source carriage within said cylindric casing adapted to carry a light source on the axis of said optical element, means supporting and guiding said carriage for forward and rearward movement in a direction parallel to the optical axis of said optical element, whereby said light source is movable between spot and flood positions, a horizontal manually rotatable shaft extending through a side wall of said depending mechanism enclosing casing and disposed at right angles to the direction of carriage movement, an operative interconnection between the inner portion of said shaft and the carriage so arranged that the light source is moved between spot and full flood positions within one revolution of the manually rotatable shaft, and friction means yieldingly resisting operation of the manual shaft.

5. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a manually rotatable shaft extending through a wall of said casing on an axis at right angles to the direction of carriage movement, an operative interconnection between the inner portion of the shaft and the light source carriage, such that rotation of the shaft through a given angle moves the carriage between spot and flood positions, a friction disk nonrotatably mounted on said manual shaft, and a stationary friction member frictionally engaged by said friction disk.

6. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a manually rotatable shaft extending through a wall of said casing on an axis at right angles to the direction of carriage movement, an operative interconnection between the inner portion of the shaft and the light source carriage, such that rotation of the shaft through a given angle moves the carriage between spot and flood positions, a friction disk splined on said manual shaft, a coil spring member surrounding said shaft and arranged to press said friction disk in one direction on the shaft, and a stationary friction member frictionally engaged by said spring urged friction disk.

7. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a manually rotatable shaft extending through a wall of said casing on an axis at right angles to the direction of carriage movement, an arm on the inner portion of said manual shaft, and a link connected between the swinging end of said arm and said carriage.

8. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a manually rotatable shaft extending through a wall of said casing on an axis at right angles to the direction of carriage movement, an arm on the inner portion of said manual shaft, a link connected between the swinging end of said arm and said carriage, a friction disk splined on said manual shaft, a coil spring member surrounding said shaft and arranged to press said friction disk in one direction on the shaft, and a stationary friction member frictionally engaged by said spring urged friction disk.

9. In a studio spot lamp embodying a lamp casing having an optical light projecting and focusing element therein, the combination of a light source carriage within said casing, a pair of parallel horizontal guide rods extending parallel to the axis of said optical element in the lower part of the lamp casing, said guide rods supporting said light source carriage for sliding movement therealong, such that a light source carried by the carriage moves along the axis of said optical element, a horizontal manually rotatable shaft extending through a wall of the casing just below and at right angles to said parallel guide rods, an operative connection between the inner portion of said shaft and the carriage so arranged that the light source is moved between spot and full flood positions within one revolution of the manually rotatable shaft, and manual shaft rotating means operating on the exterior portion of the shaft.

10. In a studio spot lamp embodying a lamp casing having a curved reflector disposed within the rearward portion thereof, the combination of a light source carriage within said casing, a pair of parallel horizontal guide rods extending parallel to the axis of the reflector in the lower part of the lamp casing, said guide rods supporting said light source carriage for sliding movement therealong, such that a light source carried by the carriage moves along the axis of the reflector, a horizontal manually rotatable shaft extending through the casing just below and at right angles to said parallel guide rods, an arm on the inner portion of said manual shaft, a link pivotally connected at one end to the swinging end of said arm, and extending from said pivotal connection in a forward direction in the lamp to a forward pivotal connection with the light source carriage, and manual shaft rotating means operating on the exterior portion of the shaft.

11. A studio spot lamp embodying a substantially cylindric side wall casing, an optical light projecting and focusing element therein, a depending mechanism enclosing casing joined to said side wall casing at the bottom thereof, said two casings opening into one another, a light source carriage within said cylindric casing adapted to carry a light source on the axis of said optical element, means supporting and guiding said carriage for forward and rearward movement in a direction parallel to the optical axis of said optical element, whereby said light source is movable between spot and flood positions, a horizontal manually rotatable shaft extending through a side wall of said depending mechanism enclosing casing and disposed at right angles to the direction of carriage movement, said shaft extending exteriorly of said casing and having an operating handle on its outer end, and an operative interconnection between the inner end of said shaft and the carriage so arranged that the light source is moved between spot and full flood positions within one revolution of the manually rotatable shaft.

12. In a studio spot lamp embodying a lamp casing having a curved reflector disposed within the rearward portion thereof, the combination of a light source carriage within said casing, a pair of parallel horizontal guide rods extending parallel to the axis of the reflector in the lower part of the lamp casing, said guide rods supporting said light source carriage for said sliding movement therealong, such that a light source carried by the carriage moves along the axis of the reflector, a horizontal manually rotatable shaft extending through a wall of the casing just below and at right angles to said parallel guide rods, an operating arm on the inner portion of said manual shaft, and a link, pivotally connected at one end of the swinging end of said arm and extending from said pivotal connection in a forward direction in the lamp to a forward pivotal connection with the light source carriage, said arm and link being so arranged as to move the carriage from its extreme rearward to its extreme forward position by a movement of the arm from a rearwardly extended position downwardly and around to a forwardly extended position, the swinging end of said operating arm being located directly below one of said guide rods, and being engageable therewith when said arm is raised from said rearwardly extended position to a position above horizontal to afford a stop to forward movement of the carriage.

13. In a studio spot lamp embodying a lamp casing having an optical light projecting and focusing element therein, the combination of a light source carriage within said casing adapted to carry a light source on the axis of said optical element, means supporting and guiding said carriage for forward movement in a direction parallel to the optical axis of said optical element, whereby said light source is movable between spot and flood positions, a horizontal manually rotatable shaft journalled in said casing on an axis at right angles to the direction of carriage movement, a rotatable shaft journalled in line with said manually rotatable shaft, an operative connection between the last mentioned shaft and the lamp carriage, a sliding driving connection between said shafts such that the manual shaft may be moved axially without breaking its driving connection with the other shaft, a locking member on said manual shaft, a stationary locking element engageable with said locking member to lock the manual shaft against rotation in one axial position of said shaft, and a spring yieldingly urging said manual shaft to such locking position, but yieldable to allow the manual shaft to be moved axially to disengage said locking member from said locking element.

14. In a studio spot lamp embodying a lamp casing having an optical light projecting and focusing element therein, the combination of a light source carriage within said casing adapted to carry a light source on the axis of said optical element, means supporting and guiding said carriage for forward and rearward movement in a direction parallel to the optical axis of said optical element, whereby said light source is movable between spot and flood positions, a rack on the lamp carriage extending parallel to the direction of carriage movement, a manually rotatable shaft extending through a wall of said casing on an axis at right angles to the direction of carriage movement, manual shaft rotating means operating on the exterior portion of the shaft, and a spur gear on said shaft meshing with said rack, said spur gear being of such size that the light source is moved between spot and full flood positions within one revolution of said rotatable shaft.

15. A studio spot lamp embodying a substantially cylindric lamp casing, an optical light projecting and focusing element therein, a depending mechanism enclosing casing detachably mounted on the lower side of said lamp casing, said two casings opening into one another, a light source carriage within said cylindric lamp casing adapted to carry a light source on the axis of said optical element, means mounted on said detachable casing supporting and guiding said carriage for forward and rearward movement in a direction parallel to the optical axis of said optical element, whereby said light source is movable between spot and flood positions, a horizontal manually rotatable shaft extending through a side wall of said depending mechanism enclosing casing and disposed at right angles to the direction of carriage movement, an operative interconnection between the inner portion of said shaft and said carriage so arranged that the light source is moved between spot and full flood positions within one revolution of the manually rotatable shaft, and manual shaft rotating means operating on the exterior portion of the shaft.

JESS C. ROSE.